United States Patent
Miller

(10) Patent No.: US 10,776,595 B2
(45) Date of Patent: Sep. 15, 2020

(54) ANTI-THEFT PEDESTAL SUSPENSION SYSTEM

(71) Applicant: Channing Everet Miller, Fort Lauderdale, FL (US)

(72) Inventor: Channing Everet Miller, Fort Lauderdale, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 15/720,144

(22) Filed: Sep. 29, 2017

(65) Prior Publication Data

US 2019/0102586 A1    Apr. 4, 2019

(51) Int. Cl.
| | | |
|---|---|---|
| *G06K 19/00* | (2006.01) | |
| *G06K 7/10* | (2006.01) | |
| *G08B 13/24* | (2006.01) | |
| *G06Q 10/08* | (2012.01) | |

(52) U.S. Cl.
CPC ..... *G06K 7/10425* (2013.01); *G06K 7/10316* (2013.01); *G06Q 10/087* (2013.01); *G08B 13/246* (2013.01); *G08B 13/2434* (2013.01); *G08B 13/2474* (2013.01)

(58) Field of Classification Search
USPC ........ 235/375, 383, 385, 435, 451, 487, 492
See application file for complete search history.

(56) References Cited

U.S. PATENT DOCUMENTS

| | | | |
|---|---|---|---|
| 3,737,155 A * | 6/1973 | Karlan | F16F 1/027 267/136 |
| 5,349,881 A | 9/1994 | Olorenshaw et al. | |
| 5,952,631 A | 9/1999 | Miyaki | |
| 6,331,838 B1 | 12/2001 | Scott et al. | |
| 7,443,361 B2 | 10/2008 | Haynes et al. | |
| 2005/0253768 A1 | 11/2005 | Bui Hung | |
| 2007/0109205 A1 | 5/2007 | Nelson | |
| 2010/0277322 A1 * | 11/2010 | Eckert | G08B 13/2434 340/572.3 |
| 2011/0148636 A1 * | 6/2011 | Carlson | G08B 13/2474 340/572.1 |

FOREIGN PATENT DOCUMENTS

DE    102004019701 A1 * 11/2005 ............. F16F 1/027

OTHER PUBLICATIONS

English machine translation of DE102004019701A1.*

* cited by examiner

*Primary Examiner* — Matthew Mikels
(74) *Attorney, Agent, or Firm* — Arent Fox LLP

(57) ABSTRACT

A pedestal for an Electronic Article Surveillance ("EAS") system, comprising: a frame; at least one antenna disposed in or coupled to the frame; and a mechanism directly coupled to the frame so as to mechanically support the pedestal in a vertical position when in use. The mechanism configured to allow the frame to transition from the vertical positon to an angled position when a force is applied to the frame by an external object, and automatically return to the vertical position when the force is no longer being applied to the frame by the external object.

17 Claims, 11 Drawing Sheets

ANTI-THEFT PEDESTAL SUSPENSION SYSTEM

BACKGROUND

Statement of the Technical Field

The present disclosure relates generally to pedestals. More particularly, the present disclosure relates to implementing systems and methods for providing an anti-theft pedestal suspension system.

Description of the Related Art

Anti-Theft pedestals or antennas are placed at the entrances to retail establishments as part of an overall system to deter theft and to track inventory. Typically, these pedestals are bolted to the floor near the store entrance to detect anti-theft tags attached to merchandise. The store entrance is often a high traffic area, and can result in collisions with shopping carts or customers resulting in damage to the pedestal or its mounting hardware.

SUMMARY

The present document concerns a pedestal for an EAS system. The pedestal comprises: a frame; at least one antenna disposed in or coupled to the frame; and a mechanism directly coupled to the frame so as to mechanically support the pedestal in a vertical position when in use. The pedestal creates a surveillance zone in which active EAS security tags can be detected by the EAS system. In this regard, the antenna is configured to transmit an electromagnetic exciter signal field or receive a signal generated by an EAS security tag in response to the electromagnetic exciter signal field. The mechanism is configured to allow the frame to (A) transition from the vertical positon to an angled position when a force is applied to the frame by an external object, and (B) automatically return to the vertical position when the force is no longer being applied to the frame by the external object.

In some scenarios, the mechanism comprises: a support structure directly coupled to the frame and having a plurality of first apertures formed therethrough; a plurality of couplers passing through the plurality of first apertures; and a plurality of first resilient members (e.g., coils) respectively disposed along an elongate length of the plurality of couplers so as to reside below a horizontal member of the support structure. The plurality of first resilient members are configured to be deflected or compressed when the force is being applied to the frame by the external object.

The mechanism may further comprise a plurality of second resilient members respectively disposed along the elongate length of the plurality of couplers so as to reside above the horizontal member of the support structure. The plurality of second resilient members are of the same type or of a different type than the plurality of first resilient members. The plurality of second resilient members and the plurality of first resilient members may have at least one different physical characteristic (e.g., durometer or rate).

In those or other scenarios, the pedestal further comprises: a switch coupled to the rotatable member and adapted to disconnect the pedestal from an external power source when the force is applied to the frame by the external object; and/or a sensor configured to detect a position of the frame and communicate a notification to a remote device when a detection is made that the antenna pedestal is in the angled position.

BRIEF DESCRIPTION OF THE DRAWINGS

Embodiments will be described with reference to the following drawing figures, in which like numerals represent like items throughout the figures.

DETAILED DESCRIPTION

Figure 1:
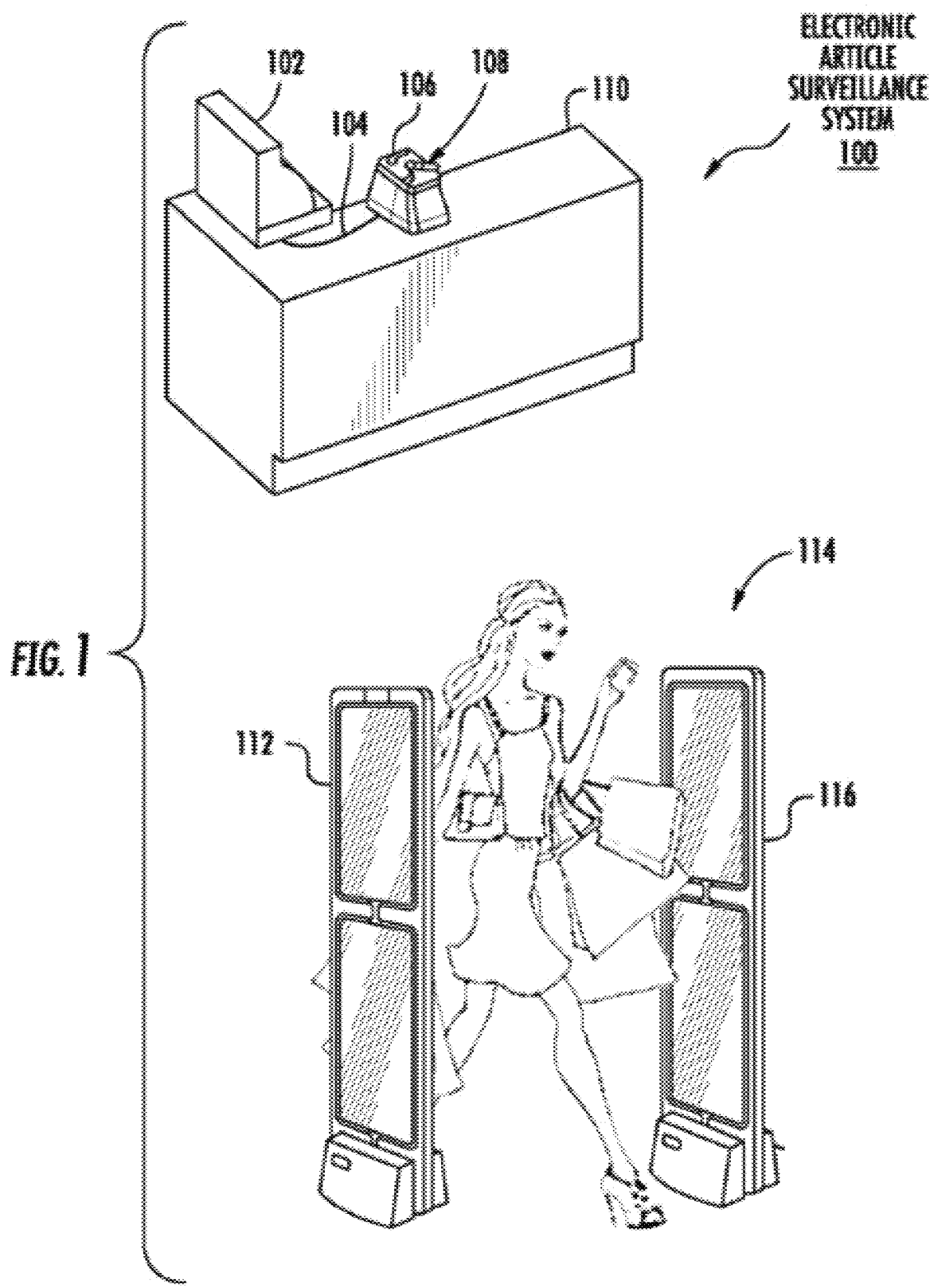
FIG. 1 is a schematic illustration of an exemplary architecture for an Electronic Article Surveillance ("EAS") system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns system and methods for pedestals and/or antennas designed to be sufficiently robust to withstand expected collisions without permanent damage. In this regard, a mechanism is provided that allows the pedestal or antenna to "give way" in a collision for preventing damage thereto. Such a mechanism allows the use of (a) lower cost materials in the pedestal's or antenna's design and/or (b) more aesthetically appealing materials (such as thin transparent panels). The design also provides features that may lessen the chance of creating, exposing and/or allowing contact with hazardous voltages and/or sharp edges that can be exposed following a severe collision or pedestal break.

This mechanism provides desirable commercial advantages. For example, the pedestals or antennas implementing the mechanism can be restored to their normal positions and normal operations after a collision. In effect, the cost and delay of a service call is eliminated. Furthermore, the ability to quickly restore the pedestals or antennas to their normal operations would prevent a store security outage.

Referring now to FIG. 1, there is provided a schematic illustration of an exemplary EAS system 100 that is useful for understanding the present solution. EAS systems are well known in the art, and therefore will not be described in detail herein. Still, it should be understood that the present solution will be described herein in relation to an acousto-magnetic (or magnetostrictive) EAS system. The present solution is not limited in this regard. The EAS system 100 may alternatively include a magnetic EAS system, an RF EAS system, a microwave EAS system or other type of EAS system. In all cases, the EAS system 100 generally prevents the unauthorized removal of articles from a retail store.

In this regard, EAS security tags 108 are securely coupled to articles (e.g., clothing, toys, and other merchandise) offered for sale by the retail store. At the exits of the retail store, detection equipment 114 sounds an alarm or otherwise alerts store employees when it senses an active EAS security tag 108 in proximity thereto. Such an alarm or alert provide notification to store employees of an attempt to remove an article from the retail store without proper authorization.

In some scenarios, the detection equipment 114 comprises antenna pedestals 112, 116. The antenna pedestals 112, 116 are configured to create a surveillance zone at the exit or checkout lane of the retail store by transmitting an EAS exciter signal. The EAS exciter signal causes an active EAS security tag 108 to produce a detectable response if an attempt is made to remove the article from the retail store. For example, the EAS security tag 108 can cause perturbations in the EAS exciter signal.

The antenna pedestals 112, 116 may also be configured to act as RFID readers. In these scenarios, the antenna pedestals 112, 116 transmit an RFID interrogation signal for purposes of obtaining RFID data from the active EAS security tag 108. The RFID data can include, but is not limited to, a unique identifier for the active EAS security tag 108. In other scenarios, these RFID functions are provided by devices separate and apart from the antenna pedestals.

The EAS security tag 108 can be deactivated and detached from the article using a detaching unit 106. Typically, the EAS security tag 108 is removed or detached from the articles by store employees when the corresponding article has been purchased or has been otherwise authorized for removal from the retail store. The detaching unit 106 is located at a checkout counter 110 of the retail store and communicatively coupled to a POS terminal 102 via a wired link 104. In general, the POS terminal 102 facilitates the purchase of articles from the retail store.

Detaching units and POS terminals are well known in the art, and therefore will not be described herein. The POS terminal 102 can include any known or to be known POS terminal with or without any modifications thereto. However, the detaching unit 106 includes any known or to be known detaching unit selected in accordance with a particular application.

In some cases, the detaching unit 106 is configured to operate as an RFID reader. As such, the detaching unit 106 may transmit an RFID interrogation signal for purposes of obtaining RFID data from an EAS security tag 108. Upon receipt of the unique identifier, the detaching unit 106 communicates the unique identifier to the POS terminal 102. At the POS terminal 102, a determination is made as to whether the unique identifier is a valid unique identifier for an EAS security tag of the retail store. If it is determined that the unique identifier is a valid unique identifier for an EAS security tag of the retail store, then the POS terminal 102 notifies the detaching unit 106 that the unique identifier has been validated, and therefore the EAS security tag 108 can be removed from the article.

Figure 2:
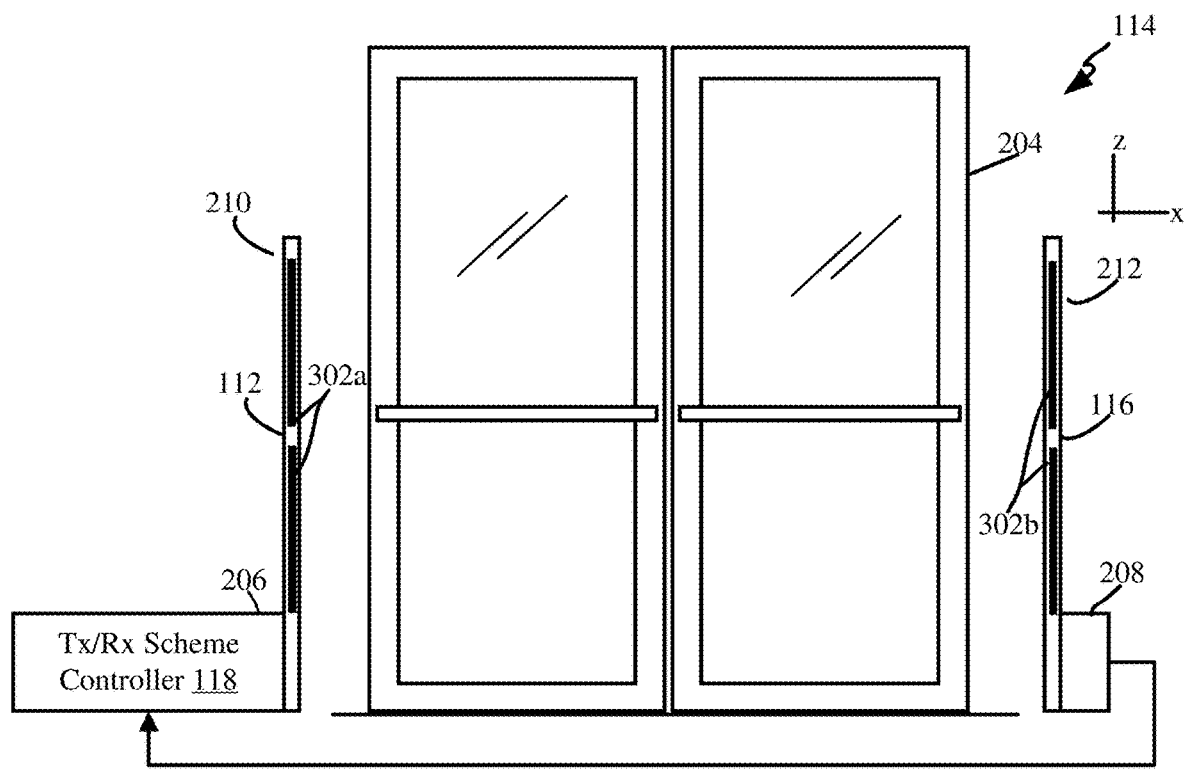
FIG. 2 is a side view of an EAS detection system.

The detection equipment 114 of FIG. 1 will now be described in more detail in relation to FIGS. 2 and 3. Notably, the detection equipment 114 is described here in terms of an AM EAS system. However, the EAS tag detection method described herein can also be used in other types of EAS systems, including systems that use RF type tags and RFID EAS systems.

The detection equipment 114 will be positioned at a location adjacent to an entry/exit 204 of a secured facility (e.g., a retail store). The detection equipment 114 uses specially designed EAS marker tags ("security tags") 108 which are applied to store merchandise or other items which are stored within a secured facility. The EAS security tags 108 can be deactivated or removed by authorized personnel at the secure facility. For example, in a retail environment, the EAS security tags 108 could be removed by store employees. When an active EAS security tag 108 is detected by the detection equipment 114 in an idealized representation of an EAS detection zone (or surveillance zone) 308 near the entry/exit, the detection equipment 114 will detect the presence of such security tag and will sound an alarm or generate some other suitable EAS response, as described above. Accordingly, the detection equipment 114 is arranged for detecting and preventing the unauthorized removal of articles or products from controlled areas.

As noted above in relation to FIG. 1, the detection equipment 114 includes a pair of pedestals 112, 116, which are located a known distance apart (e.g., at opposing sides of entry/exit 204). The pedestals 112, 116 are typically stabilized and supported by a base 206, 208. Notably, pedestal 112 is a master pedestal while pedestal 116 is a slave pedestal. Although one slave pedestal is shown in FIG. 2, the present solution is not limited in this regard. There can be any number of slave pedestals for a given application.

Base 206 of master pedestal 112 has a Tx/Rx scheme controller 118 disposed therein, or alternatively coupled thereto via a wired or wireless communications link. In the later configuration, the Tx/Rx scheme controller 118 may be located within a separate chassis at a location nearby to the master pedestal. For example, the Tx/Rx scheme controller 118 can be located in a ceiling just above or adjacent to the master pedestal 112. Base 206 is also communicatively coupled to base 208 via a wired or wireless communications link such that information specifying Tx/Rx schemes can be communicated from the master pedestal 112 to the slave pedestal 116 during operations thereof.

The Tx/Rx scheme controller 118 comprises hardware and/or software configured to: (a) implement a previously randomly selected Tx/Rx scheme that is unique to the master pedestal 112 (such as at a manufacture's facility or during an installation process); and/or (b) randomly select a Tx/Rx scheme from a plurality of Tx/Rx schemes to be employed by the master/slave pedestals 112, 116 during any given iteration of an EAS tag detection process. In the later scenario (b), the Tx/Rx scheme controller 118 randomly selects (1) the total number of timeslots or time windows in which an EAS exciter signal should be transmitted from a pedestal and (2) the particular timeslots or time windows in which the EAS exciter signal is to be transmitted from the pedestal.

The pedestals 112, 116 will each generally include one or more antennas that are suitable for aiding in the detection of EAS security tags, as described herein. In some scenarios, the master pedestal includes an antenna suitable for transmitting or producing an electromagnetic exciter signal field in the detection zone. The EAS transmitter is operated in a time multiplex manner using a plurality of N timestamps or windows, where N is an integer (e.g., 10). The slave pedestal includes an antenna suitable for receiving response signals generated by security tags in the detection zone. The antennas provided in the pedestals can be conventional conductive wire coil or loop designs as are commonly used in AM type EAS pedestals.

In other scenarios, the master pedestal 112 includes at least one antenna 302a disposed in a housing or frame 210 thereof. The antenna 302a is suitable for transmitting or producing an electromagnetic exciter signal field and receiving response signals generated by EAS security tags 108 in the detection zone 308. In some scenarios, the same antenna can be used for both receive and transmit functions. Similarly, the slave pedestal 116 can include at least one antenna 302b disposed in or coupled to a housing or fame 212 thereof. The antenna 302b is suitable for transmitting or producing an electromagnetic exciter signal field and receiving response signals generated by security tags in the detection zone 308. The antennas provided in the pedestals 112, 116 can be conventional conductive wire coil or loop designs as are commonly used in AM type EAS pedestals. These antennas will sometimes be referred to herein as exciter coils. In some scenarios, a single antenna can be used in each pedestal. The single antenna is selectively coupled to the EAS receiver. The EAS transmitter is operated in a time multiplexed manner as described herein. However, it can be advantageous to include two antennas (or exciter coils) in each pedestal as shown in FIG. 2, with an upper antenna positioned above a lower antenna.

As noted above, the detection equipment 114 comprises an AM type EAS detection system. As such, each antenna is used to generate an Electro-Magnetic ("EM") field which serves as a security tag exciter signal. The security tag exciter signal causes a mechanical oscillation of a strip (e.g., a strip formed of a magnetostrictive or ferromagnetic amorphous metal) contained in an EAS security tag within a detection zone 308. As a result of the stimulus signal, the EAS security tag 108 will resonate and mechanically vibrate due to the effects of magnetostriction. This vibration will continue for a brief time after the stimulus signal is terminated. The vibration of the strip causes variations in its magnetic field, which can induce an AC signal in the receiver antenna. This induced signal is used to indicate a presence of the strip within the detection zone 308. As noted above, the same antenna contained in a pedestal 112, 116 can serve as both the transmit antenna and the receive antenna. Accordingly, the antennas in each of the pedestals 112, 116 can be used in several different modes to detect a security tag exciter signal.

Figure 4:
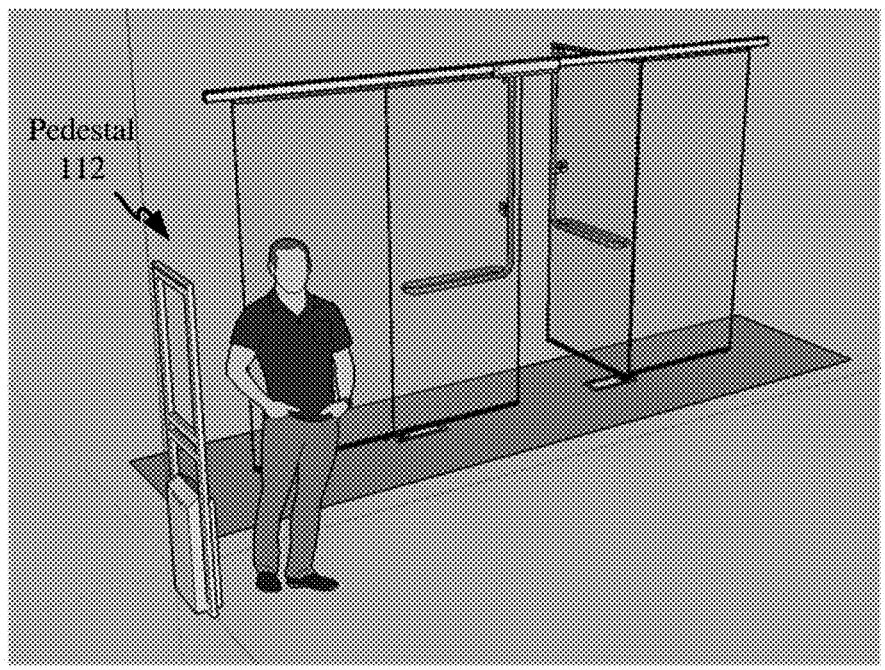
FIG. 4 provides an illustration showing an antenna pedestal in a vertical position.
Figure 5:
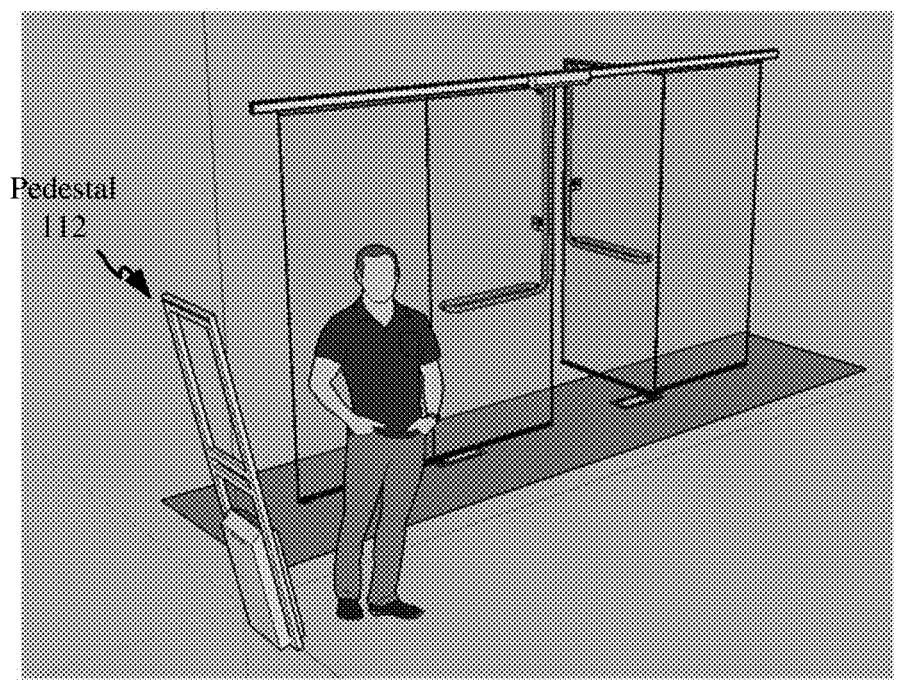
FIG. 5 provides an illustration showing an antenna pedestal in an angled position.

Notably, the pedestals 112, 116 are designed to be sufficiently robust to withstand expected collisions without permanent damage. In this regard, a mechanism is provided in each pedestal 112, 116 that allows the pedestals to "give way" in a collision for preventing damage thereto. This is illustrated in FIGS. 4-5. In FIG. 4, the pedestal 112 is in its normal position. In FIG. 5, the pedestal 112 is in its angled position after a collision. In this angled position, the antenna 302a is temporarily disabled but not damaged as a result of the collision. Notably, the pedestal 112 can rotate, twist and/or bend in any direction so as to lessen an impact force applied thereto (e.g., by a person or object in proximity thereto).

An exemplary architecture for the mechanism will now be discussed in relation to FIGS. 6-11. A perspective view of the mechanism 600 coupled to a frame (or outer housing) 210 of the pedestal 112 is provided in FIG. 6. The mechanism 600 is coupled to the frame 210 via a mechanical coupler, adhesive and/or weld. A portion of the frame 210 has been cut-away in FIG. 6 for purposes of showing the structural relationship between the mechanism 600 and frame 210.

The mechanism 600 is formed of one or more materials selected for a particular application. Such materials can include, but are not limited to, plastics, metals and/or nylon. All of the components of the mechanism 600 can be formed of a single material (e.g., plastic or metal). Alternatively, some of the components are formed of a first material (e.g., plastic) while other components are formed of a second different material (e.g., metal).

Figure 10:
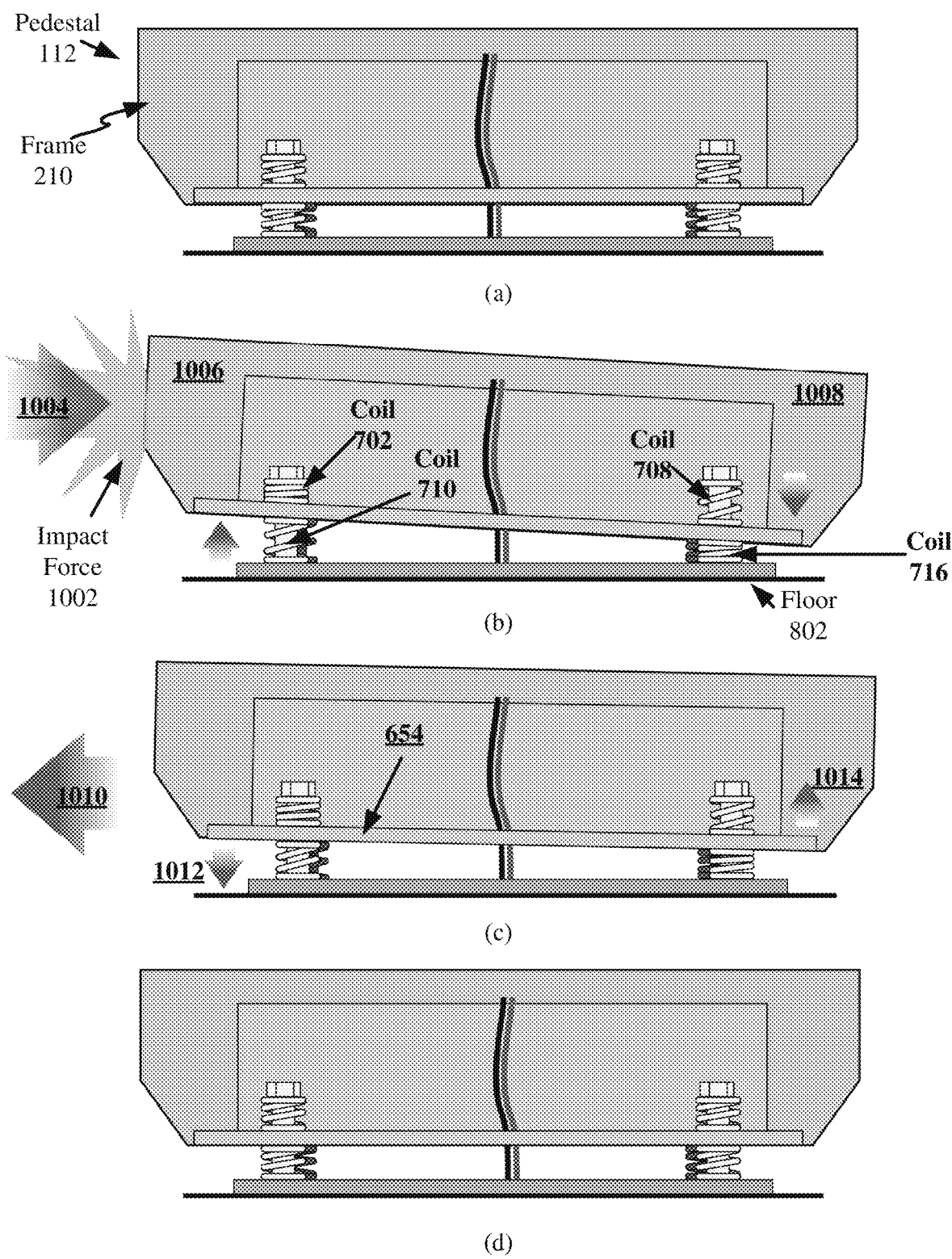
FIG. 10 provides an illustration that is useful for understanding how the antenna pedestal "gives way" when an external force is applied thereto and returns to its vertical position when the external force is no longer being applied thereto.

The mechanism 600 comprises a support structure 650 configured to mechanically support the frame 210 in its vertical position (e.g., as shown in FIG. 4) and in its deflected positions (e.g., as shown in FIG. 10). The support structure 650 includes a vertical member 652 and a horizontal member 654. The vertical and horizontal members are coupled so as to be perpendicular to each other. This coupling can be achieved via a mechanical coupler, an adhesive and/or a weld. Alternatively, the vertical and horizontal members are integrally formed as a single component. The vertical and horizontal members are formed of a rigid material, such as metal or plastic.

Figure 6:
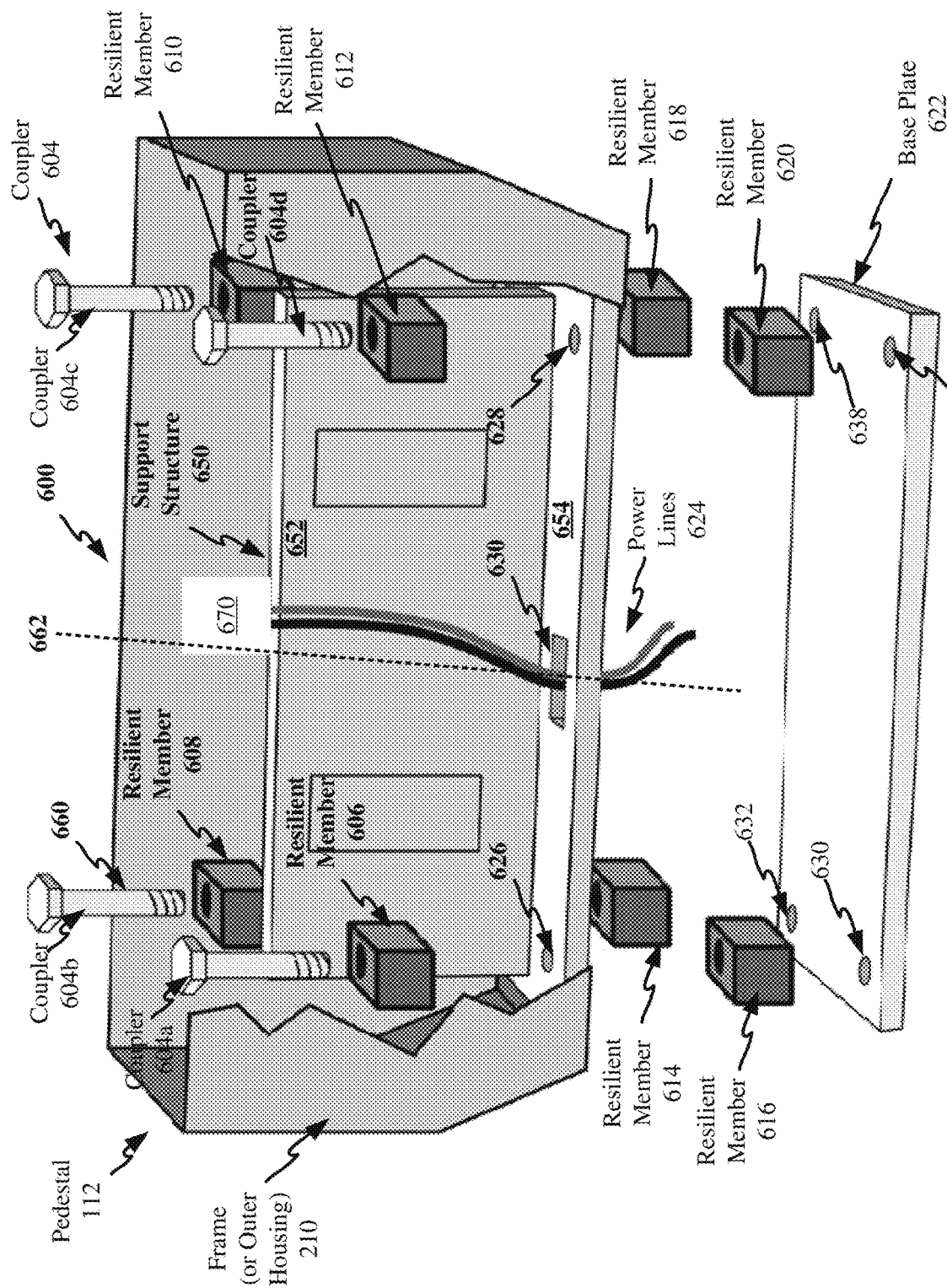
FIG. 6 provides a perspective view of an illustrative mechanism coupled to an antenna pedestal's frame.

An aperture 630 is formed through the horizontal member 654 so that power lines 624 can pass through the support structure 650 and be coupled with the internal circuitry 670 of the pedestal 112 (not shown in FIG. 6). A first end of the power lines 624 are coupled to an external power source (e.g., AC mains), while a second end of the power lines 624 is coupled to the internal circuitry 670. In this regard, both ends of the power lines 624 have electrical connectors (not shown) coupled thereto.

The horizontal member 654 is also configured to be coupled directly to the floor or indirectly to the floor via a base plate 622. The base plate 622 is an optional component that may be utilized when the floor is not suitably flat. The base plate 622 is formed of a rigid material, such as metal or plastic. The horizontal member 654 and base plate 622 are coupled to each other via mechanical couplers 604. The mechanical couplers include, but are not limited to, threaded screws. Apertures 626, 628, 630-638 are formed through the horizontal member 654 and base plate 622 for allowing the mechanical couplers 604 to pass therethrough and into threaded bores provided in the floor. In this way, the pedestal 112 is securely coupled to the floor so as to be structurally supported in its vertical position.

Notably, apertures 626, 628 formed in the horizontal member 654 are sized to allow bending movements, rotational movements and/or twisting movements by the pedestal 112 when an impact force is applied thereto. In this regard, the diameter of apertures 626, 628 is larger than the diameter of the couplers' elongate bodies 660. The size difference between the two diameters is selected in accordance with a particular application. The diameter size of the apertures 626, 628 may be selected so that the pedestal frame 210 will be prevented from bending and/or rotating more than a certain amount relative to its central axis 662.

Figure 11:
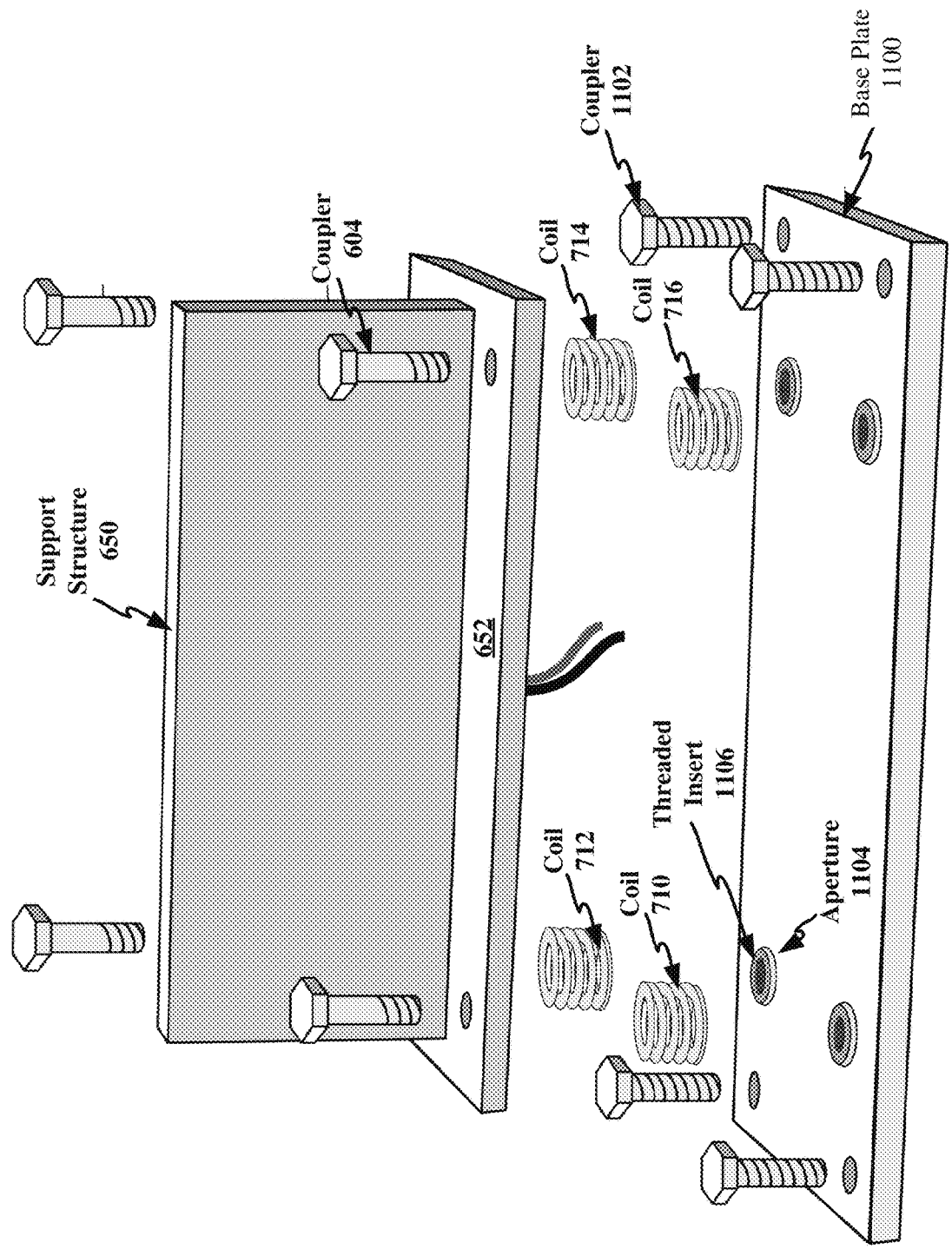
FIG. 11 is a perspective view of yet another illustrative mechanism.
Figure 12:
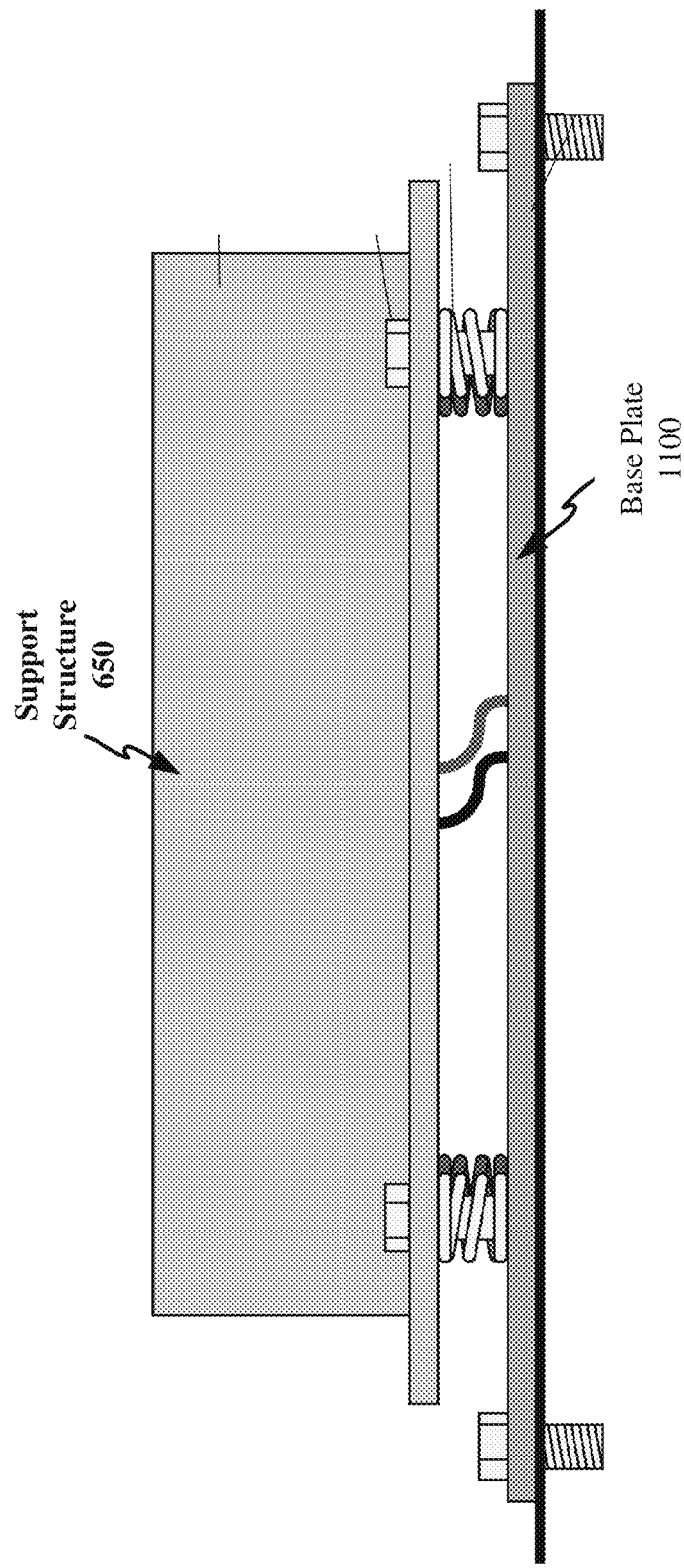
FIG. 12 is a front view of the mechanism shown in FIG. 11.

The present solution is not limited to the base plate 622 configuration shown in FIG. 6. Other base plate configurations can be used in accordance with a given application. For example, an alternative illustrative base plate configuration is shown in FIGS. 11-12. As shown in FIGS. 11-12, the couplers 604 threadingly engage the base plate 1100 rather than the floor. This threading engagement is achieved via engagement of the couplers 604 to threaded apertures formed in the base plate, or alternatively via engagement of the couplers 604 to threaded inserts 1106 inserted into the apertures 1104 formed in the base plate. Additional couplers 1102 are provided to threadingly engage the floor so as to secure the base plate 1100 thereto.

Notably, a plurality of resilient members 606-620 are provided to facilitate the rotation, twisting and/or bending of the pedestal 112 when an external force is applied thereto. In this regard, each resilient member includes, but is not limited to, a coil, a torsion bar suspension system, a leaf spring suspension system, a fluid suspension system, a ball joint, a silicone structure, a rubber structure, and/or a combination thereof. The resilient members 606-620 can be of the same or different types of resilient members. For example, a first resilient member 606 comprises a spring, while resilient member 608 comprises a silicon structure. The present solution is not limited to the particulars of the example. In the case that two or more resilient members are of the same type (e.g., coil), they can be selected to have the same or different physical characteristics (e.g., durometer, spring rate, etc.).

Two resilient members 606-620 are arranged to be disposed on a respective one of the couplers 604. The present solution is not limited in this regard. Any number of resilient members can be employed in accordance with a particular application. For example, as shown in FIGS. 11-12, four resilient members can be used instead of eight resilient members as shown in FIG. 6.

In FIG. 6, resilient member 606 is arranged to be disposed on coupler 604a above the horizontal member 654, and resilient member 616 is arranged to be disposed on coupler 604a below the horizontal member 654. Similarly, resilient member 608 is arranged to be disposed on coupler 604b above the horizontal member 654, and resilient member 614 is arranged to be disposed on coupler 604b below the horizontal member 654. Likewise, resilient member 610 is arranged to be disposed on coupler 604c above the horizontal member 654, and resilient member 618 is arranged to be disposed on coupler 604c below the horizontal member 654. Resilient member 612 is arranged to be disposed on coupler 604d above the horizontal member 654, and resilient member 620 is arranged to be disposed on coupler 604d below the horizontal member 654.

Illustrations of the mechanism 600 including coils 702-708 as the resilient members are provided in FIGS. 7-12. A front perspective view of the mechanism 600 is provided in FIG. 7. A front view of the mechanism 600 in its normal vertical position is provided in FIG. 8. A side view of the mechanism 600 in its normal vertical positon is provided in FIG. 9. Illustrations of the mechanism 600 in a plurality of positions are shown in FIG. 10.

Figure 7:
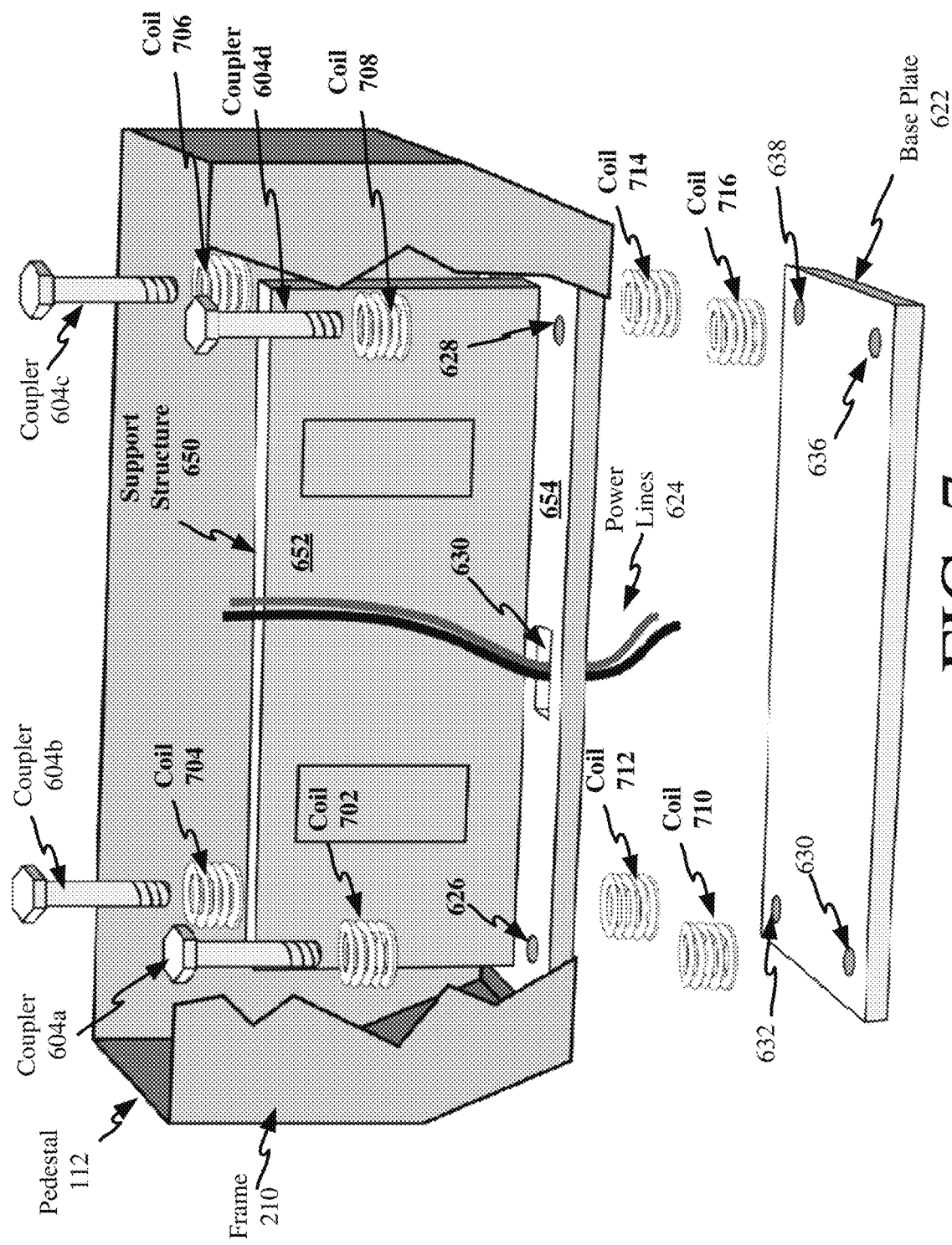
FIG. 7 provides a perspective view of another illustrative mechanism coupled to an antenna pedestal's frame.
Figure 8:
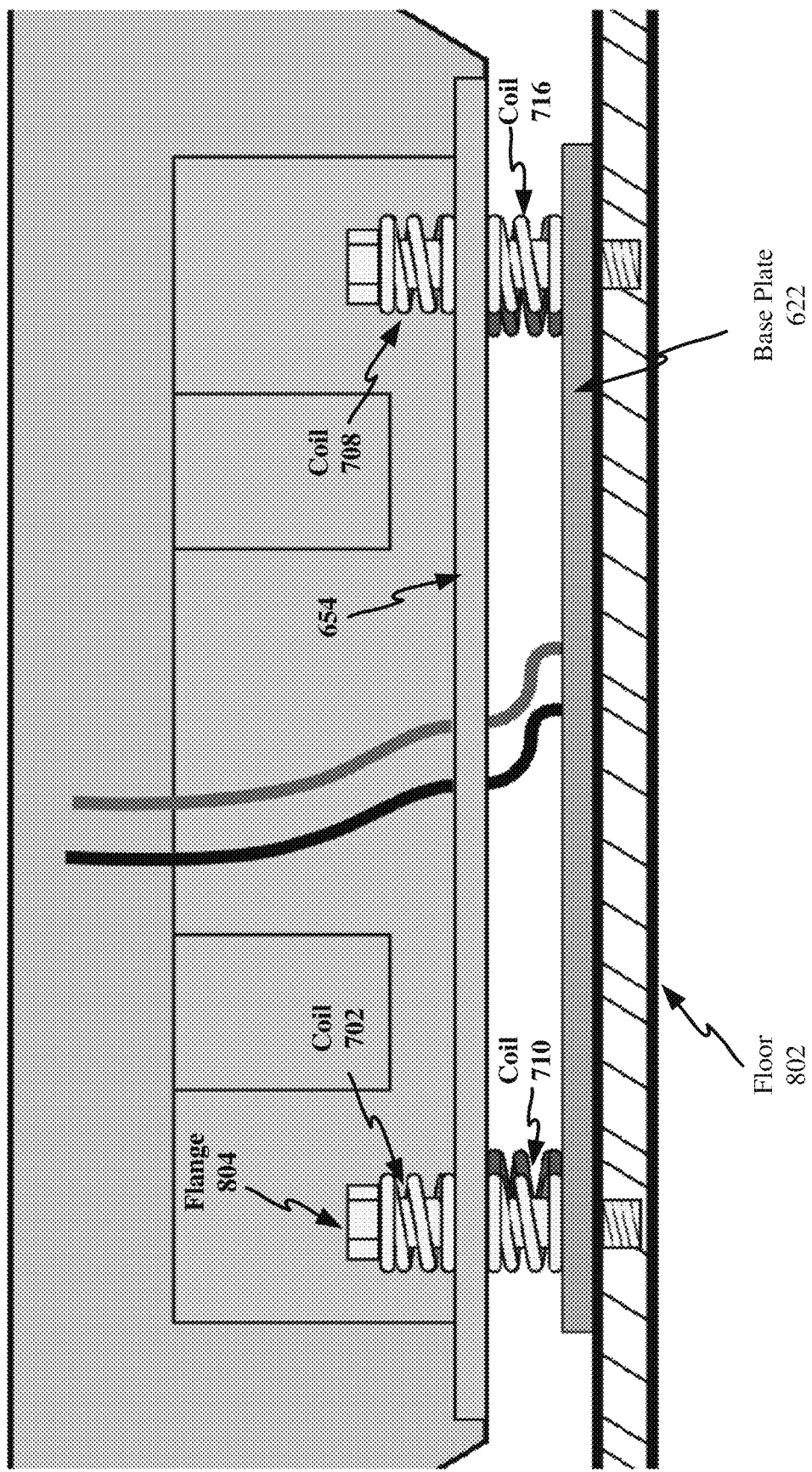
FIG. 8 is a front cut-away view showing an antenna pedestal in a vertical position.
Figure 9:
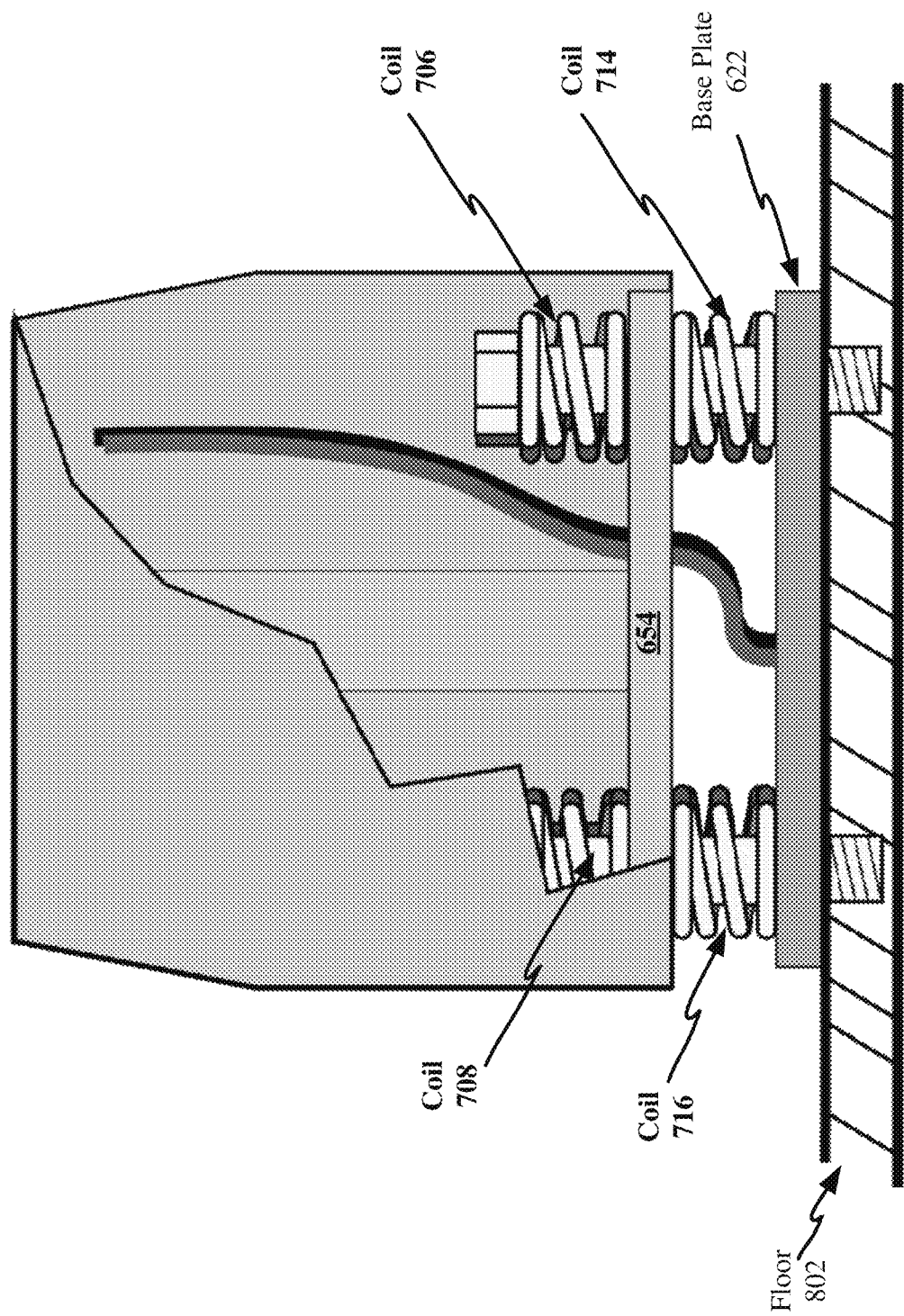
FIG. 9 is a side cut-away view showing an antenna pedestal in a vertical position.

As shown in FIGS. 7-9, two coils are arranged so as to be disposed on a respective coupler. The present solution is not limited in this regard. Any number of resilient members can be employed in accordance with a particular application. For example, as shown in FIGS. 11-12, only the four resilient members 710-716 are used instead of eight resilient members 702-716 as shown in FIG. 7.

In the scenario of FIG. 7, coil 702 is disposed on coupler 604a above the horizontal member 654, and coil 710 is disposed on coupler 604a below the horizontal member 654. Coil 704 is disposed on coupler 604b above the horizontal member 654, and coil 712 is disposed on coupler 604b below the horizontal member 654. Coil 706 is disposed on coupler 604c above the horizontal member 654, and coil 714 is disposed on coupler 604c below the horizontal member 654. Coil 708 is disposed on coupler 604d above the horizontal member 654, and coil 716 is disposed on coupler 604d below the horizontal member 654.

Each coil 702-716 is in a normally uncompressed state. When the mechanism 600 is assembled and coupled to the floor 802 as shown in FIGS. 8-9, the coils 702-716 are partially compressed between (A) a flange 804 and the horizontal member 654, or (B) the horizontal member 654 and the base plate 622. In some scenarios, the base plate 622 is not employed. In this case, the coils are partially compressed between (C) the horizontal member 654 and the floor 802, rather than as stated in (B).

Referring now to FIG. 10, there is provided an illustration that is useful for understanding how the coils 702-716 operate in order to facilitate the bending, rotating and/or twisting of the pedestal 112 when an impact force is applied thereto by an external object (e.g., a person, a shopping cart, etc.). The pedestal 112 is shown in its normal vertical position in FIG. 10(a). In FIG. 10(b), an impact force 1002 is applied to the pedestal's frame 210 in the direction shown by arrow 1004. The impact force 1002 causes the pedestal 112 to "give way", bend or rotate such that a first side 1006 is raised away from the floor 802 and a second side 1008 is lowered towards the floor 802. As a result of the pedestal's movement, coils 702, 716 are compressed and coils 710, 708 are uncompressed.

When the impact force is no longer being applied to the pedestal 112, the spring 702 applies a downward force on the horizontal member 654 as shown by arrow 1012, while spring 716 applies an upward force on the horizontal member 654 as shown by arrow 1014. Consequently, the pedestal 112 travels in direction 1010 until it returns to its normal vertical position shown in FIG. 10(d).

Figure 13:
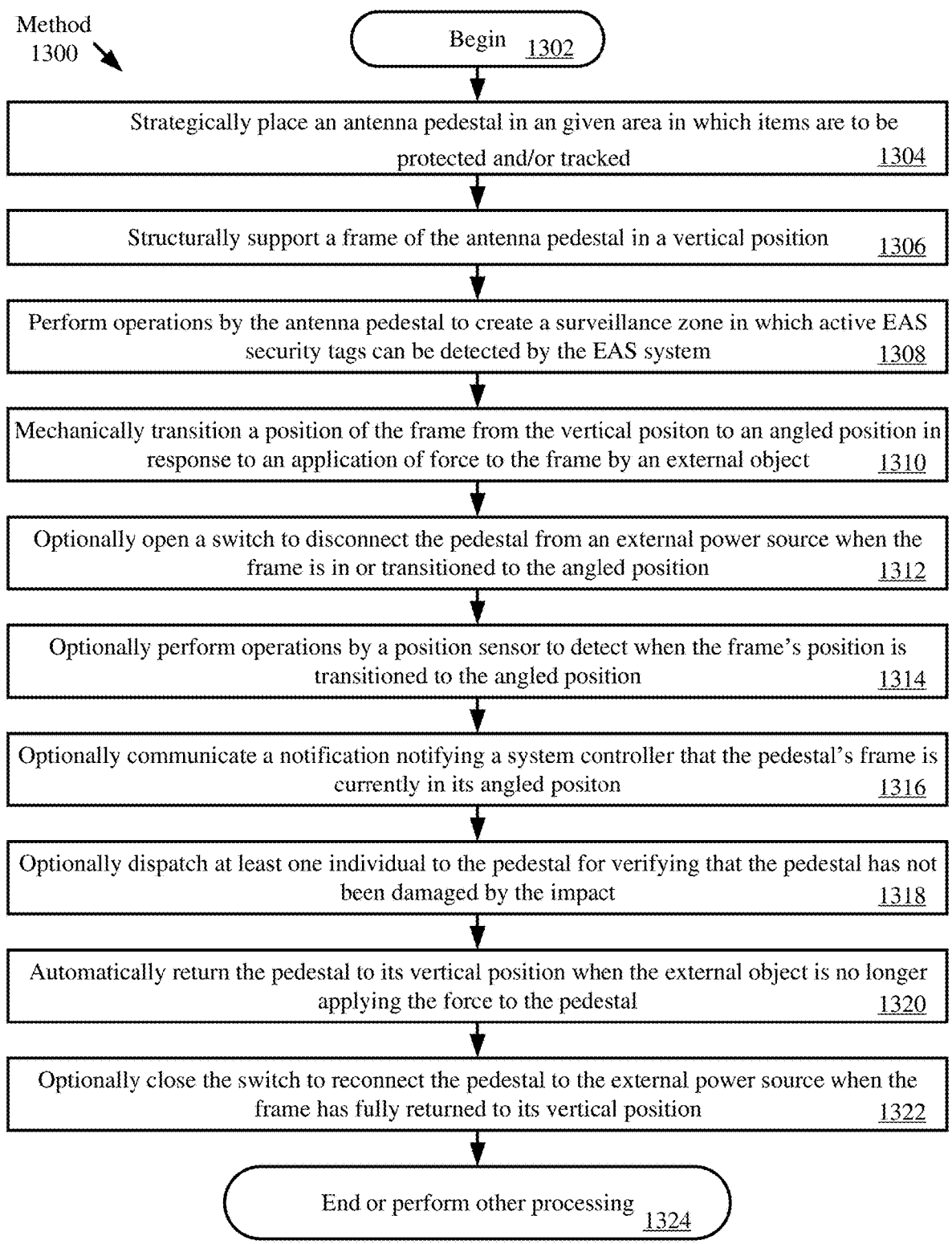
FIG. 13 provides a flow diagram of an exemplary method for operating an antenna pedestal of an EAS system.

Referring now to FIG. 13, there is provided a flow diagram of an exemplary method 1300 for operating a pedestal (e.g., pedestal 112 or 116 of FIG. 1) for an Electronic Article Surveillance ("EAS") system (e.g., EAS system 100 of FIG. 1). Method 1300 begins with 1302 and continues with 1304 where an antenna pedestal (e.g., antenna pedestal 112 or 116 of FIG. 1) is strategically placed in a given area (e.g., at the exit or checkout lane of the retail store) in which items (e.g., retail store merchandise) are to be protected (e.g., from theft) or tracked (e.g., for inventorying purposes). Next in 1306, a frame (e.g., frame 210 or 212 of FIG. 2) of the antenna pedestal is structurally supported in a vertical position. In some scenarios, the frame is maintained in the vertical position while the pedestal is in use at least partially by a support structure (e.g., chassis 650 of FIG. 6).

Figure 3:
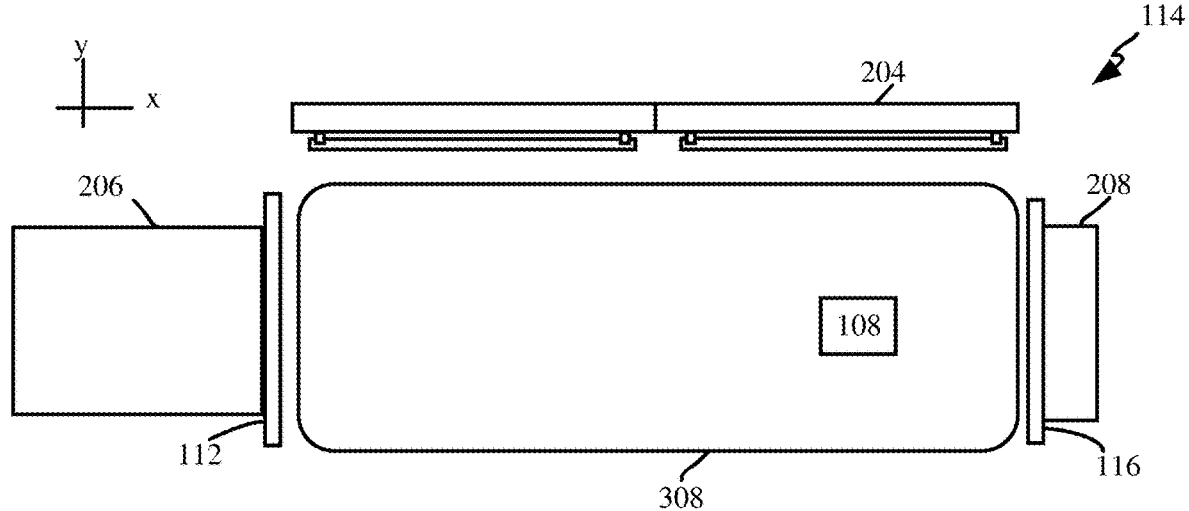
FIG. 3 is a top view of the EAS detection system in FIG. 2, which is useful for understanding an EAS detection zone thereof.

In 1308, the antenna pedestal performs operations to create a surveillance zone (e.g., EAS detection zone (or surveillance zone) 308 of FIG. 3) in which active EAS security tags (e.g., EAS security tag 108 of FIG. 1) can be detected by the EAS system. Methods for creating surveillance zones are well known in the art, and therefore will not be described in detail herein. Any known or to be known method for creating a surveillance zone can be used herein without limitation. For example, in some scenarios, the antenna is configured to transmit an electromagnetic exciter signal field and/or receive a signal generated by an EAS security tag in response to the electromagnetic exciter signal field.

Thereafter in 1310, a force is applied to the antenna pedestal's frame by an external object (e.g., a person or shopping cart). Consequently, the frame's position is mechanically transitioned from its vertical position (e.g., the vertical position shown in FIGS. 1-4, 8, 9, 10(a) and 10(d)) to its angled position (e.g., the angled position shown in FIGS. 5 and 10(b)). In some scenarios, the frame's position is mechanically transitioned by compressing or otherwise deflecting at least some of the resilient members (e.g., resilient members 602-616 of FIG. 6 or 702-716 of FIG. 7) of a mechanism (e.g., mechanism 600 of FIG. 6) to which the pedestal's frame is attached.

In optional 1312, a switch is opened whereby the pedestal is disconnected from an external power source when the frame is in or transitioned to the angled position. The switch can be part of the internal circuitry (e.g., circuitry 670 of FIG. 7) of the pedestal. Switches are well known in the art, and therefore will not be described herein. Any known or to be known switch can be used herein without limitation.

In optional 1018, a position sensor of the pedestal's internal circuitry performs operations to detect when the frame's position is transitioned to the angled position. Upon such detection, a system controller (e.g., controller 118 of FIG. 2) is notified that the pedestal's frame is currently in its angled position, as shown by optional 1316. In response to this notification, at least one individual (e.g., store personnel) is dispatched to the antenna pedestal for checking if the pedestal has been damaged as a result of the external object's impact therewith.

Once the force is no longer being applied to the pedestal, the pedestal automatically returns to its normal vertical position as shown by 1320. In optional 1322, the switch is closed when the pedestal has fully returned to its vertical position. The closing of the switch reconnects the pedestal to the external power source. The switch can be closed automatically via the detection of the pedestal's vertical state or manually by an individual. Subsequently, 1324 is performed where method 1300 ends or other processing is performed (e.g., return to 1306).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A pedestal for an Electronic Article Surveillance ("EAS") system, comprising:
   a frame;
   at least one antenna disposed in or coupled to the frame;
   a mechanism directly coupled to the frame so as to mechanically support the pedestal in a vertical position when in use, and comprising at least two resilient members configured to:
      allow the frame to transition from the vertical positon to an angled position when a force is applied to the frame by an external object, and
      automatically return to the vertical position when the force is no longer being applied to the frame by the external object,
   wherein a first resilient member of the at least two resilient members is vertically stacked above at least a portion of the frame and a second resilient member of the at least two resilient members when the pedestal is in the vertical position, and the first and second resilient members (a) are separate and distinct components, (b) are separated from each other by the portion of the frame above which the first resilient member resides and below which the second resilient member resides, and (c) are of different types or have at least one different characteristic.

2. The pedestal according to claim 1, wherein the antenna is configured to transmit an electromagnetic exciter signal field or receive a signal generated by an EAS security tag in response to the electromagnetic exciter signal field.

3. The pedestal according to claim 1, wherein the pedestal creates a surveillance zone in which active EAS security tags can be detected by the EAS system.

4. The pedestal according to claim 1, wherein the mechanism comprises:

a support structure directly coupled to the frame and having a plurality of first apertures formed therethrough;

a plurality of couplers passing through the plurality of first apertures; and a plurality of third resilient members respectively disposed along an elongate length of the plurality of couplers so as to reside below a horizontal member of the support structure, wherein the plurality of third resilient members are configured to be deflected or compressed when the force is being applied to the frame by the external object.

5. The pedestal according to claim 4, wherein the plurality of third resilient members comprise coils.

6. The pedestal according to claim 4, wherein the mechanism further comprises a plurality of fourth resilient members respectively disposed along the elongate length of the plurality of couplers so as to reside above the horizontal member of the support structure.

7. The pedestal according to claim 4, wherein the plurality of third resilient members are of the same type or different type as the plurality of fourth resilient members.

8. The pedestal according to claim 7, wherein the plurality of fourth resilient members and the plurality of third resilient members have at least one different physical characteristic.

9. A pedestal for an Electronic Article Surveillance ("EAS") system, comprising:

a frame;

at least one antenna disposed in or coupled to the frame; and a mechanism directly coupled to the frame so as to mechanically support the pedestal in a vertical position when in use, and configured to allow the frame to transition from the vertical positon to an angled position when a force is applied to the frame by an external object, and automatically return to the vertical position when the force is no longer being applied to the frame by the external object, wherein the pedestal further comprises a switch coupled to the mechanism and adapted to disconnect the pedestal from an external power source when the force is applied to the frame by the external object.

10. A pedestal for an Electronic Article Surveillance ("EAS") system, comprising:

a frame;

at least one antenna disposed in or coupled to the frame;

a mechanism directly coupled to the frame so as to mechanically support the pedestal in a vertical position when in use, and configured to:

allow the frame to transition from the vertical positon to an angled position when a force is applied to the frame by an external object, and automatically return to the vertical position when the force is no longer being applied to the frame by the external object; and a sensor configured to detect a position of the frame and communicate a notification to a remote device when a detection is made that the pedestal is in the angled position.

11. A method for operating an antenna pedestal of an Electronic Article Surveillance ("EAS") system, comprising:

structurally supporting a frame of the antenna pedestal in a vertical position using a mechanism directly coupled to the frame, wherein an antenna is disposed in or coupled to the frame;

performing operations by the antenna to create a surveillance zone in which active EAS security tags can be detected by the EAS system;

using the mechanism to mechanically transition a position of the frame from the vertical positon to an angled position in response to an application of force to the frame by an external object;

using the mechanism to automatically return the antenna pedestal to the vertical position when the force is no longer being applied to the frame by the external object; and operating a switch to disconnect the antenna pedestal from an external power source when the force is applied to the frame by the external object.

12. The method according to claim 11, wherein the mechanism comprises:

a plurality of first apertures formed therethrough;

a plurality of couplers passing through the plurality of first apertures; and a plurality of first resilient members respectively disposed along an elongate length of the plurality of couplers so as to reside below a horizontal member of the support structure, wherein the plurality of first resilient members are configured to be deflected or compressed when the force is being applied to the frame by the external object.

13. The method according to claim 12, wherein the plurality of first resilient members comprise coils.

14. The method according to claim 12, wherein the mechanism further comprises a plurality of second resilient members respectively disposed along the elongate length of the plurality of couplers so as to reside above the horizontal member of the support structure.

15. The method according to claim 14, wherein the plurality of first resilient members are of the same type or different type as the plurality of second resilient members.

16. The method according to claim 15, wherein the plurality of second resilient members and the plurality of first resilient members have at least one different physical characteristic.

17. The method according to claim 11, further comprising communicating a notification to a remote device when a detection is made that the antenna pedestal is in the angled position.

* * * * *

UNITED STATES PATENT AND TRADEMARK OFFICE
CERTIFICATE OF CORRECTION

PATENT NO. : 10,776,595 B2  
APPLICATION NO. : 15/720144  
DATED : September 15, 2020  
INVENTOR(S) : Channing Everet Miller Page 1 of 1

It is certified that error appears in the above-identified patent and that said Letters Patent is hereby corrected as shown below:

On the Title Page

In Item (57), under "ABSTRACT", in Column 2, Line 7, delete "positon" and insert -- position --, therefor.

In the Drawings

In Fig. 13, Sheet 11 of 11, for Tag "1304", in Line 1, delete "an given" and insert -- a given --, therefor.
In Fig. 13, Sheet 11 of 11, for Tag "1310", in Line 1, delete "positon" and insert -- position --, therefor.

In the Specification

In Column 1, Line 38, delete "positon" and insert -- position --, therefor.
In Column 8, Line 33, delete "positon" and insert -- position --, therefor.

In the Claims

In Column 10, Line 42, in Claim 1, delete "positon" and insert -- position --, therefor.
In Column 11, Line 33, in Claim 9, delete "configured to" and insert -- configured to: --, therefor.
In Column 11, Line 34, in Claim 9, delete "positon" and insert -- position --, therefor.
In Column 11, Line 51, in Claim 10, delete "positon" and insert -- position --, therefor.
In Column 11, Line 53, in Claim 10, delete "object, and" and insert -- object; --, therefor.
In Column 12, Line 16, in Claim 11, delete "positon" and insert -- position --, therefor.

Signed and Sealed this  
First Day of December, 2020

Andrei Iancu  
*Director of the United States Patent and Trademark Office*